United States Patent [19]
Crossman et al.

[11] Patent Number: 5,309,187
[45] Date of Patent: * May 3, 1994

[54] HIGH MAGNIFICATION OPHTHALMIC LENS

[75] Inventors: Janet L. Crossman; Phillip J. Erickson, both of Bellevue; Gregory L. Heacock, Seattle, all of Wash.; Martin A. Mainster, Leawood, Kans.

[73] Assignee: Ocular Instruments, Inc., Bellevue, Wash.

[*] Notice: The portion of the term of this patent subsequent to Apr. 16, 2008 has been disclaimed.

[21] Appl. No.: 856,320

[22] Filed: Mar. 18, 1992

[51] Int. Cl.$^5$ .................................... A61B 3/00
[52] U.S. Cl. .................. 351/219; 351/160 R
[58] Field of Search .......... 351/160 R, 161, 219, 351/205; 359/708

[56] References Cited

U.S. PATENT DOCUMENTS

| | | | |
|---|---|---|---|
| 3,770,342 | 11/1973 | Dudragne | 351/7 |
| 3,820,879 | 6/1974 | Frisen | 351/1 |
| 3,954,329 | 5/1976 | Pomerantzeff | 351/16 |
| 4,023,189 | 5/1977 | Govignon | 354/62 |
| 4,027,952 | 6/1977 | Hugues | 350/189 |
| 4,134,647 | 1/1979 | Ramos-Caldera | 351/6 |
| 4,222,634 | 9/1980 | Muchel | 350/189 |
| 4,265,519 | 5/1981 | Pomerantzeff | 351/16 |
| 4,357,088 | 11/1982 | Pomerantzeff | 354/62 |
| 4,410,245 | 1/1983 | Koester | 351/219 |
| 4,452,514 | 6/1984 | Spitznas | 351/206 |
| 4,469,413 | 9/1984 | Shirayanagi | 350/432 |
| 4,502,764 | 3/1985 | Riquin | 351/160 R |
| 4,627,694 | 12/1986 | Volk | 351/214 |
| 4,637,699 | 1/1987 | Sigelman | 351/205 |
| 4,669,839 | 6/1987 | Muchel | 351/221 |
| 4,671,631 | 6/1987 | Sigelman | 351/205 |
| 4,682,866 | 7/1987 | Volk | 351/205 |
| 4,704,018 | 11/1987 | Takhashi | 351/206 |
| 4,721,378 | 1/1988 | Volk | 351/205 |
| 4,728,183 | 3/1988 | Heacock et al. | 351/219 |
| 4,738,521 | 4/1988 | Volk | 351/205 |
| 5,007,729 | 4/1991 | Erickson et al. | 351/219 |
| 5,189,450 | 2/1993 | Crossman et al. | 351/219 |

FOREIGN PATENT DOCUMENTS

| | | | |
|---|---|---|---|
| 124502 | 5/1984 | European Pat. Off. | 351/219 |
| 1188326 | 3/1965 | Fed. Rep. of Germany | 42/32/02 |
| 2246182 | 3/1974 | Fed. Rep. of Germany | 351/219 |
| 2660505C2 | 9/1977 | Fed. Rep. of Germany | 351/219 |
| 2610821 | 12/1977 | Fed. Rep. of Germany | . |
| 2559668 | 5/1979 | Fed. Rep. of Germany | . |
| 2136927 | 12/1972 | France | . |
| 2248814 | 5/1975 | France | 351/219 |
| 2203260 | 10/1988 | United Kingdom | . |

OTHER PUBLICATIONS

P. Roussel et al., "Contact Glass for Use . . . Optical Aspects," *International Ophthalmology* 6:183–190 (1983).

Sudarsky, R. D., Volk, D., "Aspherical Objective Lenses as an Aid in Indirect Ophthalmoscopy, A Preliminary Report," Reprinted from *American Journal of Ophthalmology* 47:572–575 (Apr. 1959).

Schlegel, H. J., "Simple Wide-Angle Optics for Split Lamp Microscopy Examinations of the Fundus of the Eye (Panfundoscopy)," *Documenta Ophthalmologica* 26:300–308 (1969).

Pomerantzeff, O., Govignon, J., "Design of a Wide-Angle Ophthalmoscope," *Arch. Opthal.* 86:420–424 (Oct. 1971).

Pomerantzeff, O., "A Lens System for Wide-Angle Fundus Photography," *Ophthalmic Photography* 16:101–108 (Summer 1976).

(List continued on next page.)

*Primary Examiner*—William L. Sikes
*Assistant Examiner*—Hung Xuan Dang
*Attorney, Agent, or Firm*—Christensen, O'Connor, Johnson & Kindness

[57] ABSTRACT

An ophthalmic lens having two elements, a contact lens and an entry lens. The lens produces a magnified aerial image of the fundus of the eye, and can also be used for laser delivery to the fundus. The lens is particularly useful because it provides high magnification and detail of the fundus as well as excellent steroscopic field.

19 Claims, 1 Drawing Sheet

OTHER PUBLICATIONS

Pomerantzeff, O., Webb, R. H., Delori, F. C., "Image Formation in Fundus Cameras," *Invest. Ophthalmol. Visual Sci.* 18:630–637 (Jun. 1979).

Pomerantzeff, O., "Wide-Angle Noncontact and Small-Angle Contact Cameras," *Invest. Ophthalmol. Visual Sci.* 19:973–979 (Aug. 1980).

Charles L. Schepens, M.D., *Retinal Detachment and Allied Diseases*, W. B. Saunders Company, Philadelphia, 1983, Ch. 43, "New and Improved Diagnostic and Surgical Procedures," pp. 1107–1155.

Dieckert, J. P., et al., "Contact Lenses for Laser Applications," *Ophthalmology: Instrument and Book Supplement* 79–87 (1984).

Pomerantzeff, O., "Theory and Practice of the Equator Plus Camera (EPC)", Conf. Proceedings of International Symposium on Ophthalmological Optics (May 7–9, 1978) 117–118.

James H. Allen, M.D., *May's Manual of the Diseases of the Eye for Students and General Practitioners*, 24th ed., The Williams & Wilkins Company, Baltimore, 1968, p. 280.

Sir Stewart Duke-Elder and David Abrams, *System of Ophthalmology*, vol. 5, *Ophthalmic Optics and Refraction*, The C. V. Mosby Company, St. Louis, 1970, p. 423.

Arnold Sorsby, Ch. 34, "Biology of the Eye as an Optical System," pp. 1–17.

HIGH MAGNIFICATION OPHTHALMIC LENS

FIELD OF THE INVENTION

The present invention relates to ophthalmic lenses employed in connection with ophthalmic diagnostic and surgical procedures and, more particularly, to a two element ophthalmic lens that is utilized for observation and magnification of the fundus and for delivery of laser energy thereto.

BACKGROUND OF THE INVENTION

Ophthalmic lenses are conventionally used for observation of various locations within the eye by ophthalmologists. These ophthalmic lenses normally include a contact lens, that is, a lens that directly contacts the cornea of the eye, and may include an entry lens that is spaced in the anterior direction from the contact lens. The two lenses are normally joined by a housing.

Most ophthalmic lenses of the type just described have been created and designed for use as an observation tool utilized in conjunction with a slit lamp or ophthalmic microscope. While most prior lenses function reasonably well for use as an observation tool, the advent of laser microsurgery and the accompanying need to deliver a laser beam safely within the eye has created a need for ophthalmic lenses that not only provide improved images of the desired location in the eye but also have the capability to deliver laser energy to the desired location with minimum effect on other portions of the eye. One example of modern ophthalmic lens utilized in diagnosis and surgical procedures is disclosed in U.S. Pat. No. 4,728,183. That lens uses an aspheric entry lens to produce an aerial image spaced from and anterior of the entry lens. A combination of the contact lens and the aspheric lens produces an aerial image that has very high resolution, even in the peripheral area of the image. The lens also produces very little reflected or scattered light as well as a nondistorting path through which the laser beam can pass during treatment of a patient's pahtology. The lens disclosed in this patent also maintains a wide cone angle on the laser beam as it passes through the patient's cornea and crystalline lens to minimize energy absorption in those areas of the patient's eye. This lens, however, has a relatively small field of view on the order of±45°. A second contact lens currently in use and disclosed in U.S. Pat. No. 5,007,729 supplements that disclosed in the '183 patent. That lens has a relatively wide field of view on the order of±62.5°. This lens is especially useful for treatment of retinal detachment in the peripheral area of the fundus and also for other procedures such as panretinal photocoagulation.

Both of these prior art lenses, however, have magnifications less than 1×. The '183 lens has a magnification on the order of 0.96, while the lens disclosed in the '729 patent has a magnification on the order of 0.68. It is desirable to possess a magnifying lens that provides superior retinal clarity for detecting macular problems such as macular degeneration and diabetic retinal thickening. A magnifying lens will also facilitate the location of subtle vascular landmarks during macular photocoagulation. These fine details may be apparent angiographically but are hard to find without high magnification in the low contrast ophthalmoscopic image. It is preferable to maintain an aerial image that is flat or concave when viewed from the anterior direction, that is, concave as viewed by the ophthalmologist, since an image that is convex toward the ophthalmologist tends to be unacceptably distorted, and also degrades stereo perception. Moreover, it is preferably to maintain the aerial image less than about 45 millimeters from the patient's cornea so that the lens is useful with all standard slit lamp microscopes used by ophthalmologists. In addition, while achieving these desirable ends, it is also desirable to provide a lens that has a relatively wide binocular and stereoscopic field of view.

One such magnifying lens is disclosed in Crossman et al. entitled High Magnification Ophthalmic Lens, patent application Ser. No. 702,608 filed May 21, 1991. That lens is a three element lens that was developed after several unsuccessful efforts to develop a satisfactory two element lens. The three element lens is satisfactory for the intended purpose; it is, however, more difficult and more expensive to manufacture. In addition, the field of view is smaller than is desirable, leading to a requirement for positioning the lens on the eye at just the right angle so that the proper area of the fundus is displayed. In the interim, significant time and effort was devoted to the design of a two element lens. While one of ordinary skill might believe that the design of a two element lens is relatively straight forward, that is not actually the case. Many hundreds of person hours must be devoted to the design without any assurance of success.

SUMMARY OF THE INVENTION

Applicants however have succeeded in designing a lens that provides a magnification of at least 1.2× that has a relatively wide field of view compared to prior lenses, and has an excellent image quality. The present invention also provides an improved ophthalmic lens that yields an aerial image that is flat or slightly concave when viewed from the anterior direction and which is positioned sufficiently close to the eye so that it can be used with current slip lamp microscopes, as well as other types of microscopes. In addition, the contact lens of the present invention provides a field of view that is significantly wider than that achieved with the prior three element lens while still maintaining a high degree of stereoscopic field.

The lens constructed in accordance with the present invention comprises a contact lens having a posterior surface and an anterior surface. The posterior surface of the lens has a curvature compatible with the anterior surface of a cornea. The anterior surface of the contact lens has a predetermined curvature. The indices of refraction of the contact lens can range from 1.47 to 1.85. Preferably the anterior surface is spherical, having a predetermined radius of curvature $R_{2C}$. $R_{2C}$ can range from 6.0 mm to 15 mm. The axial thickness of the contact lens ($T_C$) can range from 1 mm to 12 mm. The ophthalmic lens also has an entry lens positioned anterior to the contact lens. The entry lens is aspheric, with its surfaces being defined by the formula:

$$Z = \frac{CK^2}{1 + \sqrt{1 - C^2EK^2}},$$

wherein $C=(1/R)$, $E=b+1$, and $K^2=X^2+Y^2$, wherein for the anterior surface of the lens, $R_{2EL}$ ranges from 20 mm to 90 mm and $b_{2EL}$ ranges from 7.0 to −4.0, and wherein for the posterior surface of said lens, $R_{1EL}$ ranges from 10 mm to 50 mm, and $b_{1EL}$ ranges from 0 to −4. The entry lens preferably has a thickness ($T_{EL}$) ranging from 6 mm to 14 mm. The indices of refraction can range from 1.47 to 1.85. The entry lens collects the light rays emerging from the contact lens and produces an aerial image anterior to and preferably in close proximity to the entry lens. The contact lens and the entry lens elements are positioned relative to each other and have their curvature chosen such that light rays originating on the fundus of the eye are magnified in the aerial image produced by the entry lens at a magnification greater than 1.0×.

BRIEF DESCRIPTION OF THE DRAWING

A better understanding of the present invention can be derived by reading the ensuring specification in conjunction with the accompanying drawing wherein the FIGURE is a schematic view of the lens constructed in accordance with the present invention shown positioned on a patient's eye.

DETAILED DESCRIPTION OF THE PREFERRED EMBODIMENT

Figure 1:
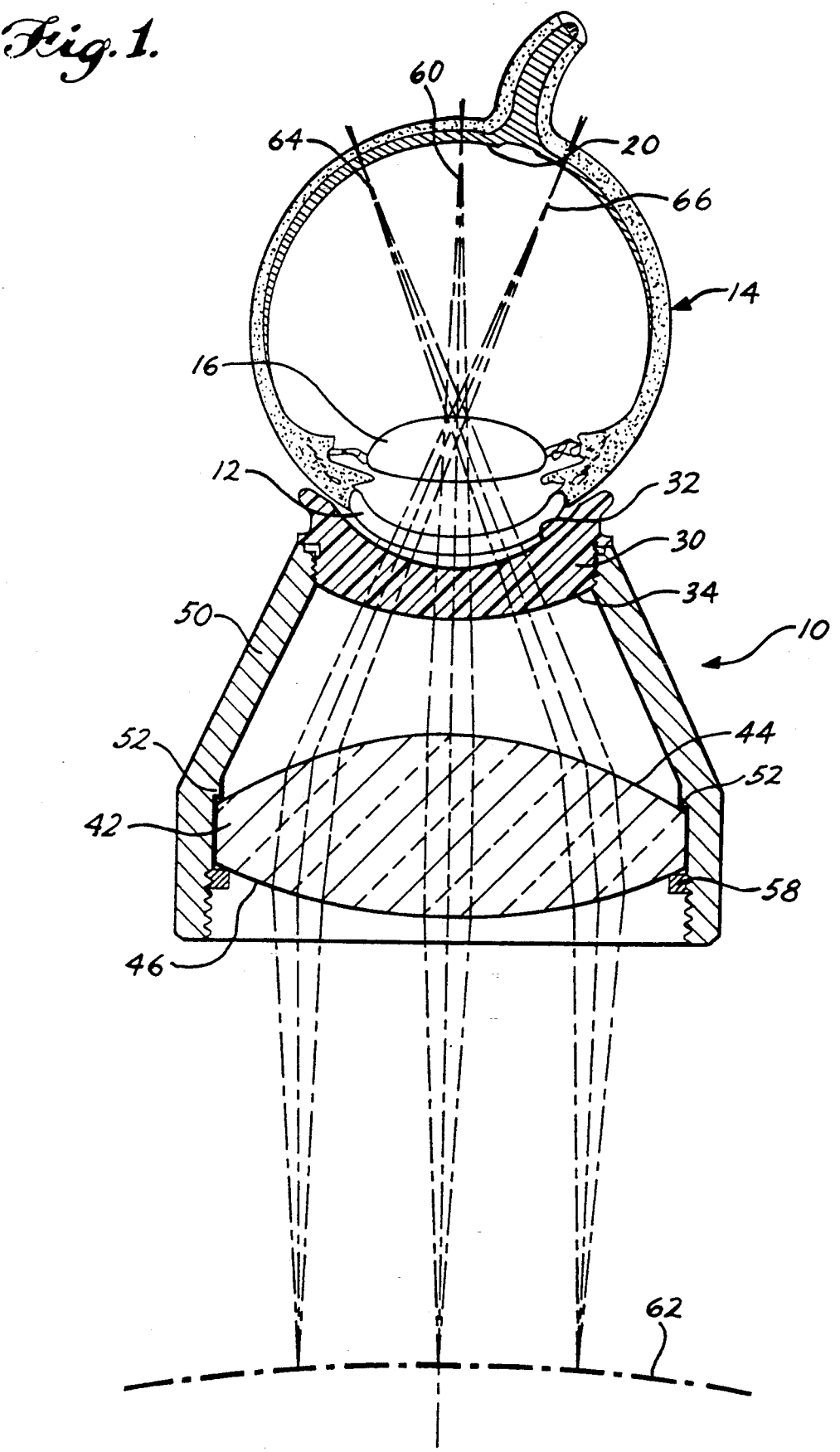

Referring first to the FIGURE, the ophthalmic lens 10 constructed in accordance with the present invention is positioned over the cornea 12 of a human eye, schematically represented at 14. The eye includes the crystalline lens 16 and the fundus 20.

The ophthalmic lens 10 includes a contact lens 30 having a posterior surface 32 and an anterior surface 34. The posterior surface of the contact lens has a curvature that is compatible with the cornea. That curvature may be spheric or aspheric. While the curvature may be the same radius as that of the average human cornea, it is preferred that the curvature be slightly less than the radius of the anterior surface of the average human cornea. Preferably, a spheric surface having a radius $R_{1C}$ is chosen so that slight vaulting occurs along the optical axis to separate the posterior surface of the contact lens from the optical region of the cornea. A preferred radius $R_{1C}$ is −7.45 mm. The thickness $T_C$ of the contact lens and the anterior curvature of the contact lens are chosen in accordance with the critical design parameters of the present invention discussed in more detail below. Again the anterior surface may be aspheric, but is preferably spherical.

The entry lens 42 is an aspheric lens designed especially for the ophthalmic lens of the present invention. Both the posterior and anterior surfaces 44 and 46, respectively, of the aspheric lens are defined by the formula:

$$Z = \frac{CK^2}{1 + \sqrt{1 - C^2 E K^2}},$$

wherein $C = (1/R)$, $E = b+1$, and $K^2 = X^2 + Y^2$. Higher order aspheric terms have been omitted from the equation because they have an insignificant effect on the optical performance of the lens system. Also manufacturing to the tolerances mandated by higher order terms is expensive and does not yield a meaningful increase in image quality.

For the posterior surface of the aspheric lens, $R_{1EL}$ can range from 10 mm to 50 mm. For the posterior surface, $b_{1EL}$ can range from 0 to −4.0. For the anterior surface of the lens, $R_{2EL}$ can range from 20 mm to 90 mm. For the anterior surface, $b_{2EL}$ can range from about 7.0 to −4.0. The sign convention for the foregoing formula is that the Z axis extends from the vertex of the surface in the direction of the center of curvature of the lens surface, as defined by the vertex radius. The center thickness $T_{EL}$ of the aspheric lens along the optical axis can range from 6 mm to 14 mm, and is preferably 8.00 mm ± 5%. A most preferred diameter for the aspheric lens is about 23 ± 0.2 mm.

The contact lens and aspheric entry lens can be made from any suitable optically transparent material such as polymethylmethacrylate (PMMA) or glass having an index of refraction from 1.47 to 1.85. In the preferred embodiment of the invention, the contact lens comprises PMMA or a similar suitable material having an index of refraction of about 1.50 ± 0.03. The aspheric entry lens is comprised of a suitable optical material, preferably an allyl diglycol carbonate polymer, and has an index of refraction of most preferably 1.50 ± 0.03. The two lenses are held by a lens holder 50 of conventional design. The holder positions the lenses about 4 mm apart. The circumference of the contact lens is externally threaded and engages an internally threaded bore at the posterior end of the cone, while the aspheric lens rests on shoulder 52 and is retained against that shoulder by conventional threaded retaining ring 58.

In use, light from the fundus in the region of the optical axis of the eye and the lens travels along a path indicated by light ray 60 through the crystalline lens 16, the cornea 12 and along the optical axis of the ophthalmic lens 10. The rays are focused in an aerial plane indicated by dot-dash line 62, anterior to the anterior surface of the entry lens 42. In accordance with the present invention, light rays from the adjacent portions of the fundus of the eye travel along paths indicated by ray tracing 64 and 66. The rays pass through the crystalline lens 16 and the cornea 12 and into the contact lens 30. The rays 64 and 66 emerging from the contact lens are then intercepted and refracted by the entry lens and focused at the aerial image plane 62.

In accordance with the preferred embodiment of the invention, the aerial image is essentially flat. One of the obstacles that had to be surmounted in the design of the present lens is to maintain the aerial image which is flat or slightly concave when viewed from the anterior direction. As one of ordinary skill increases the dioptric power of the lenses in a lens combination of this sort, the aerial image tends to become convex in the anterior direction. A convex aerial image is undesirable because it causes the ophthalmologist to have a feeling of stereoscopic disorientation. It is preferred that the aerial image be positioned greater than about 2 mm but less than 30 mm from the anterior surface of the entry lens, and more preferably from 22 to 23 mm from the entry lens. The optics of the present lens are also designed so that the aerial image is greater than 17 mm, but less than 55 mm, and most preferably less than 40 mm, from the anterior surface of the cornea. These distances are measured using the average emmetropic human eye. In this manner, the ophthalmic lens can be used with virtually all of the conventional slit lamp microscopes in use by physicians.

The optics of the contact lens are designed in conjunction with the optics of the aspheric entry lens to achieve the objectives of the ophthalmic lens of the present invention. Use of aspherical surfaces for the contact lens were considered, but found not necessary to achieve the objectives of the invention. The preferred optical parameters of the contact lens and the aspheric entry lens provide the desired objectives, that is, an ophthalmic lens that magnifies the fundus, that retains an aerial image that is flat or slightly concave when viewed from the anterior direction, and provides a relatively wide field of view for a magnifying lens with a large stereoscopic field. Specifically, the lens 10 provides an aerial image having a magnification greater than 1.0×, preferably from 1.1× to 1.5×, and most preferably 1.25×±0.05×. In addition, the preferred lens also provides an instantaneous binocular field of view on the order of ±37.5° and a stereoscopic field on the order of ±21.5°, both measured from the optical axis using the posterior nodal point of the eye as the vertex of the angle. The optical parameters of the two lenses also combine to yield a lens that has an aerial image that is sufficiently close to the cornea so that the lens can be used with virtually all conventional slit lamp microscopes.

The lens parameters discovered by applicant are set forth in the table below. The set of values for which a workable combination of elements can be found are set forth in the preferred range of parameters. Applicant has two most preferred lens combinations that fall within the broad set of parameters. Therefore a second set and third set of parameters are also set forth for the most preferred embodiments of the present invention.

| Lens | Preferred Parameters | Most Preferred Parameters (1) | Most Preferred Parameters (2) |
|---|---|---|---|
| Contact lens | | | |
| $R_{1C}$ | −6.5 to −8.5 | −7.45 ± 5% | −7.45 ± 5% |
| $R_{2C}$ | 6 to 15 | 11.50 ± 5% | 11.50 ± 5% |
| $T_C$ | 1 to 12 | 4.25 ± 5% | 4.25 ± 5% |
| $N_C$ | 1.47 to 1.85 | 1.50 ± .03 | 1.50 ± .03 |
| Entry lens | | | |
| $R_{1EL}$ | 10 to 50 | 12.76 ± 5% | 14.16 ± 5% |
| $b_{1EL}$ | −4.0 to 0 | −1.73 ± 5% | −2.11 ± 5% |
| $R_{2EL}$ | 20 to 90 | 48.80 ± 5% | 31.00 ± 5% |
| $b_{2EL}$ | −4.0 to 7.0 | 3.35 ± 5% | −0.59 ± 5% |
| $T_{EL}$ | 6 to 14 | 8.0 ± 5% | 8.00 ± 5% |
| $N_{EL}$ | 1.47 to 1.85 | 1.50 ± .03 | 1.50 ± .03 |

All dimensions are in millimeters. N and b are dimensionless. The indices of refraction are measured at a wavelength of 587 nanometers.

Also in the preferred embodiment, the respective diameters of the contact and entry lenses are 14.00±0.20 mm and 23.00±0.20 mm, respectively. These lenses should be spaced from each other by distances that provide optimum system performance. This spacing can range from 0 to 12 mm. In the preferred embodiment, it is desirable to position the lenses 2 mm to 8 mm from each other. It is most preferred that the distance between the lenses is from 3.5 to 4.2 mm.

A lens constructed and designed in accordance with the parameters set forth above will achieve all of the functional characteristics above. The present invention has been disclosed in connection with a preferred embodiment. It is intended that one of ordinary skill will be able to effect various alterations, substitutions of equivalents and make other changes without departing from the broad concepts disclosed herein. It is therefore intended that the Letters Patent granted hereon be limited only by the definition contained in the appended claims and equivalents thereof.

The embodiments of the invention in which an exclusive property or priviledge is claimed are defined as follows:

1. A magnifying ophthalmic lens for observing the fundus of the eye and for delivering laser energy thereto comprising:
    a contact lens having a posterior surface and an anterior surface, said posterior surface having a curvature compatible with the anterior surface of a cornea, the anterior surface of the contact lens having a predetermined curvature wherein the indices of refraction of said contact lens can range from 1.47 to 1.85, and the axial thickness of the contact lens ($T_C$) can range from 1 mm to 12 mm, and
    an entry lens positioned anterior to the contact lens, the entry lens being aspheric, the surfaces of the entry lens being defined by the formula:

$$Z = \frac{CK^2}{1 + \sqrt{1 - C^2 E K^2}},$$

wherein
$C = (1/R)$,
$E = b + 1$, and
$K^2 = X^2 + Y^2$,
wherein for the anterior surface of the lens,
$R_{2EL}$ ranges from 20 mm to 90 mm and
$b_{2EL}$ ranges from 7.0 to −4.0, and
wherein for the posterior surface of said lens,
$R_{1EL}$ ranges from 10 mm to 50 mm, and
$b_{1EL}$ ranges from 0 to −4.0,
said entry lens having a thickness ($T_{EL}$) ranging from 6 mm to 14 mm, wherein said entry lens has an index of refraction ranging from 1.47 to 1.85, the optical axes of the contact lens and the aspheric lens being substantially coincident, the entry lens collecting the light rays emerging from the contact lens and producing an aerial image anterior to the entry lens, the contact lens and the entry lens element being positioned relative to each other and having their curvatures chosen such that light rays originating on the fundus of the eye are magnified in the aerial image produced by the entry lens, at a magnification greater than 1.0×.

2. The ophthalmic lens of claim 1, wherein said aerial image is flat or slightly concave when viewed from the anterior direction.

3. The ophthalmic lens of claim 1, wherein the radius of curvature ($R_{2C}$) of the anterior surface of the contact lens ranges from 6.0 mm to 15 mm.

4. The ophthalmic lens of claim 3, wherein the index of refraction of the contact lens is 1.50±0.03, $R_{1C}$ is −7.45 mm±5%, $R_{2C}$ is 11.5 mm±5%, and $T_C$ is 4.25 mm±5%.

5. The ophthalmic lens of claim 4, wherein the index of refraction of the entry lens is 1.50±0.03, and wherein $R_{1EL}$ is 12.76 mm±5% and $R_{2EL}$ is 48.80 mm±5%, $b_{1EL}$ for the posterior surface is about −1.73±5%, $b_{2EL}$ for the anterior surface is about 3.35±5%, and the thickness is about 8.0±5%.

6. The ophthalmic lens of claim 5, wherein the aerial image is positioned from 3 mm to 30 mm from the anterior surface of the entry lens, as measured using the average emmetropic human eye.

7. The ophthalmic lens of claim 4, wherein the index of refraction of the entry lens is 1.50±0.03, wherein $R_{1EL}$ is 14.16 mm±5%, and $R_{2EL}$ is 31.00 mm±5%, $b_{1EL}$ is about −2.11±5%, $b_{2EL}$ is −0.59±5%, and the thickness ($T_{EL}$) is about 8.0 mm±5%.

8. The opthalmic lens of claim 7 wherein the aerial image is positioned from 3 mm to 30 mm from the anterior surface of the entry lens, as measured using the average emmetropic human eye.

9. The ophthalmic lens of claim 1, wherein the aerial image is positioned greater than 3 mm and less than 30 mm from the anterior surface of the entry lens.

10. The ophthalmic lens of claim 1, wherein the magnification ranges from 1.15× to 1.30×.

11. An ophthalmic lens for viewing the fundus comprising:
   (a) a contact lens having a posterior surface with a curvature compatible with the cornea of an eye and being positionable in mutually opposing contact relationship with said cornea, and an entry lens, said lenses being aligned along their respective optical axes, said lenses being constructed when said contact lens is in contact with the cornea to gather light rays from the fundus and focus them in a magnified aerial image anterior to said entry lens, the magnification being in the range of 1.0× to 1.5×.

12. The lens of claim 11 having a magnification greater than 1.1×.

13. The lens of claim 11 having a magnification in the aerial image ranging from 1.15× to 1.30×.

14. The lens of claim 11, wherein said aerial image is flat or slightly concave when viewed from the anterior direction.

15. The lens of claim 11, wherein said entry lens is aspheric.

16. The lens of claim 11, wherein said aerial image is positioned less than 55 mm from the anterior surface of the cornea.

17. An othalmic lens for viewing the fundus comprising:
   (a) a contact lens having a curvature compatible with the cornea of an eye and being positionalbe in mutually opposing contact relationship with said cornea, and an entry lens, said lenses being aligned along their respective optical axes, said lenses being constructed when said contact lens is in contact with the cornea to gather light rays from the fundus and focus them in a magnified aerial image anterior to said entry lens, said lens being constructed so that the aerial image is formed less than 55 mm from the anterior surface of the cornea when said contact lens is in contact with the cornea, the magnification being in the range of 1.0× to 1.5×.

18. The lens of claim 17, wherein said aerial image is positioned less than 40 mm from the anterior surface of the cornea.

19. An ophthalmic lens for viewing the fundus comprising:
   (a) a contact lens having a curvature compatible with the cornea of an eye and being positionable in mutually opposing contact relationship with said cornea, and an entry lens, said lenses being aligned along their respective optical axes, said lenses being constructed when said contact lens is in contact with the cornea to gather light rays from the fundus and focus them in a magnified aerial image anterior to said entry lens, the magnification being in the range of 1.1× to 1.5×, and having a binocular field of view on the order of ±37.5° and a stereoscopic field of view on the order of ±21.5°, measured from the optical axes.

* * * * *